United States Patent

Park

[11] Patent Number: 6,128,029
[45] Date of Patent: Oct. 3, 2000

[54] DEVICE FOR CORRECTING NON-LINEARITY OF SCANNER IN IMAGE FORMING APPARATUS

[75] Inventor: Sang-shin Park, Suwon, Rep. of Korea

[73] Assignee: Samsung Electronics Co., Ltd., Kyungki-do, Rep. of Korea

[21] Appl. No.: 09/113,554

[22] Filed: Jul. 10, 1998

[30] Foreign Application Priority Data

Jul. 30, 1997 [KR] Rep. of Korea ............ 97-36180

[51] Int. Cl.[7] .................................. B41J 2/435
[52] U.S. Cl. .................. 347/247; 347/237; 347/235; 347/249
[58] Field of Search .................... 347/235, 237, 347/247, 250, 252, 249; 358/448, 481, 406; 712/1

[56] References Cited

U.S. PATENT DOCUMENTS

| | | | |
|---|---|---|---|
| 5,177,621 | 1/1993 | Ohtaki et al. | 358/406 |
| 5,331,342 | 7/1994 | Shimatani et al. | 347/249 |
| 5,453,851 | 9/1995 | Faulhaber | 358/481 |
| 5,764,378 | 6/1998 | Oda et al. | 358/448 |
| 5,815,726 | 9/1998 | Cliff | 712/1 |

*Primary Examiner*—N. Le
*Assistant Examiner*—Hai C. Pham
*Attorney, Agent, or Firm*—Sughrue, Mion, Zinn, Macpeak & Seas, PLLC

[57] ABSTRACT

A device for correcting the non-linearity of a scanner comprising: a reset pulse generator for generating a reset pulse with a predetermined pulse width in synchronization with a scanning start signal generated corresponding to an input photosensitive belt sensing signal; an address generator for outputting an address by being reset by the reset pulse; a look-up table, that is initiated by the scanning start signal, for receiving an address from the address generator and for outputting information corresponding to the address in the form of digital data; and a converter for outputting a synchronizing signal with a frequency corresponding to the digital data from the LUT. Another aspect of this invention is a method for correcting the non-linearity of a scanner.

7 Claims, 3 Drawing Sheets

DEVICE FOR CORRECTING NON-LINEARITY OF SCANNER IN IMAGE FORMING APPARATUS

BACKGROUND OF THE INVENTION

1. Field of the Invention

The present invention relates to an image forming apparatus and method, and more particularly, to a device and method for correcting non-linearity of a scanner with a variable pulse width scanning position signal.

2. Description of the Related Art

Generally, in an image forming apparatus such as a laser printer, on encountering a scanning start signal, a laser scanning unit scans a photosensitive belt to form a latent image. A developing device then supplies a liquid toner to the photosensitive belt. The developing device then develops the latent image to form a toner image. This toner image is printed on a paper sheet by transfer and fixing devices. In a process, while scanning is performed, the scanner non-linearity is corrected synchronously at the rising edge of a scanning start signal. In particular, correction of the non-linearity of the scanner comprises the steps of: detecting a predetermined portion of the photosensitive belt, generating the scanning start signal; and generating a synchronizing signal corresponding to the scanning start signal wherein the frequency of the generated synchronizing signal is used as the image input frequency of the scanner.

FIG. 1 shows a block diagram illustrating the structure of a conventional device used in correcting the non-linearities associated with a scanner. Referring to FIG. 1, a conventional device for correcting the non-linearity of a scanner comprises: a counter 100, and a converter 120. The counter counts scanning start signals and is reset by the scanning start signal; a look-up table (LUT) 110 is initiated by the scanning start signal. The LUT recognizes an output of the counter 100 as an address, and outputs the look-up table information corresponding to the address in the form of digital data. The converter 120 outputs a clock signal having a frequency corresponding to the digital data output from the LUT 110. The clock signal is input to a laser scanning unit (not shown) which performs the scanning.

In the conventional device a pattern for generating a synchronizing signal is created at a portion of a photosensitive belt. The device is operated synchronously by the scanning start signal that is generated by sensing the pattern. In such a conventional device, since the pulse width of the scanning start signal may be abnormally deformed due to vibrations from sources such as the photosensitive belt, a starting point for correcting non-linearity may be imprecisely determined. FIGS. 2A and 2B show timing diagrams illustrating the problem encountered by a conventional device for correcting the non-linearity of the scanner.

Referring to FIG. 2A, when a scanning start signal (SOS) of a normal pulse width is generated, the counter 100 is reset at the falling edge of the scanning start signal, and generates a corresponding address signal, for example, address 1, address 2, address 3, etc. The corresponding digital data such as LUT information 1, LUT information 2, LUT information 3, stored in the LUT 110 is output in correspondence with the address signal. The converter 120 outputs a synchronizing signal having frequencies such as $f_1$, $f_2$, $f_3$, etc., corresponding to the digital data. As the counter 100 outputs subsequent address signals, the above procedure is repeated.

However, as shown in FIG. 2B, the address signal output from the counter 100, the digital data output from the LUT 110, and the synchronizing signal output from the converter 120 are delayed when a scanning start signal ($SOS_{max}$) with a larger pulse width is generated because of the vibrations in the photosensitive belt.

As described above, in the conventional device for correcting the non-linearity of the scanner, the pulse width of a scanning start signal may be abnormally narrowed or widened due to mechanical errors caused by vibrations from sources such as the photosensitive belt, and accordingly the correction starting position is imprecisely determined. Consequently, the non-linearity of the scanner cannot be corrected precisely in the conventional device.

SUMMARY OF THE INVENTION

To solve the above problem, it is an objective of the present invention to provide a device for correcting the non-linearity of a scanner that is not affected by the changes of the pulse width of the scanning start signal caused by the vibrations of a photosensitive belt.

Accordingly, to achieve the above objective, there is provided a device for correcting non-linearity of a scanner comprising: a reset pulse generator for generating a reset pulse with a predetermined pulse width; an address generator for outputting an address by being reset by the reset pulse; a LUT (look-up table) initiated by a scanning start signal, for receiving an address from the address generator and for outputting information as digital data corresponding to the address; and a converter for outputting a synchronizing signal with a frequency corresponding to the digital data.

Preferably, the information stored in the LUT is created by measuring the scanner linearity under same conditions that a scanning start signal of a preset pulse width was generated. The reset pulse generator generates a pulse having the same pulse width as the pulse width of the scanning start signal used when the information stored in the LUT was created, and generates the reset pulse in synchronization with the rising edge of the scanning start signal. The LUT is enabled in synchronization with the falling edge of the scanning start signal, and the address generator is a counter.

Another aspect of this invention is a method for correcting non-linearity of a scanner, said method comprises: sensing a sensing signal in a photosensitive belt; generating a scanning start signal corresponding to the sensing signal; generating a reset pulse with a predetermined pulse width in synchronization with the scanning start signal; generating and outputting addresses on receiving the reset pulse; generating digital data from LUT corresponding to said addresses; and outputting synchronizing signals with a frequency corresponding to the digital data.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 1:
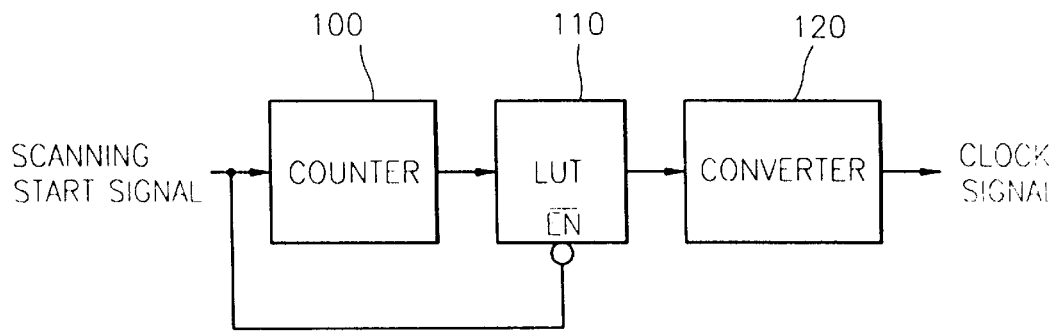
FIG. 1 is a block diagram illustrating a conventional device for correcting the non-linearity of a scanner.
Figure 3:
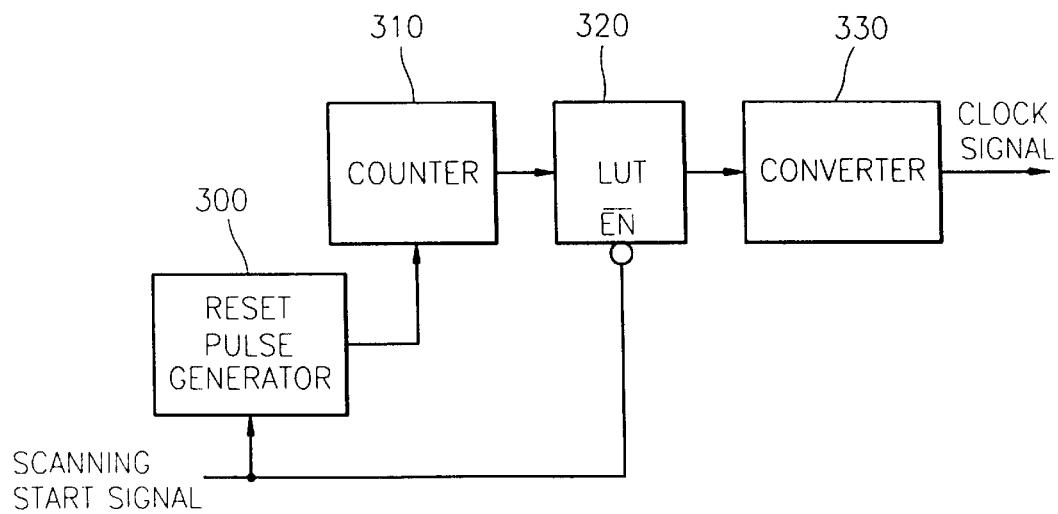
FIG. 3 is a block diagram illustrating a device for correcting the scanner non-linearity of a scanner according to the present invention.
Figure 2A:
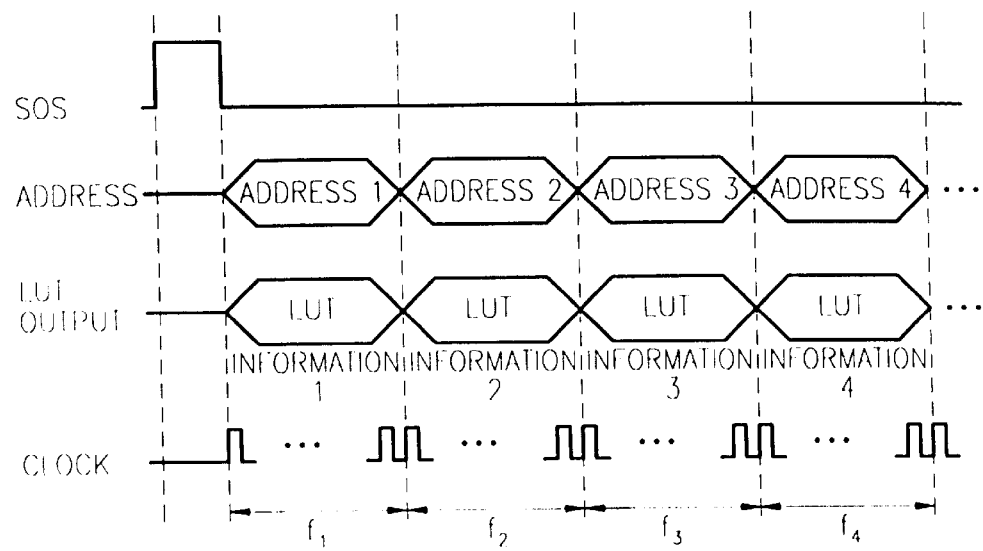
FIG. 2A is a timing diagram illustrating output signals when a scanning start signal is normally generated in the device of FIG. 1.
Figure 2B:
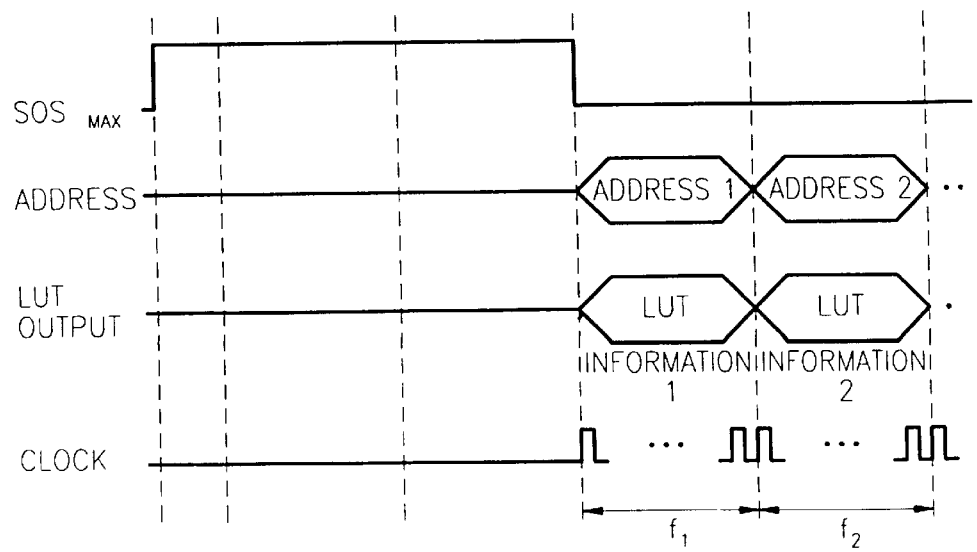
FIG. 2B is a timing diagram illustrating output signals when a scanning start signal is generated for an extended duration in the device of FIG. 1.

FIG. 3 shows a block diagram illustrating the components of a device for correcting non-linearity of a scanner according to the present invention. Referring to FIG. 3, the device according to the present invention comprises a reset pulse generator 300, a counter 310, a LUT (look-up table) 320 and a converter 330. A clock signal is input as a scanning start signal.

The scanning start signal is input into the reset pulse generator 300 and the LUT 320. This input initiates the reset pulse generator 300 to output a reset pulse of a predetermined pulse width. This output enables the LUT 320. At this time, information is already stored in the LUT 320. The LUT information was created originally by measuring the scanner linearity under the same conditions that a scanning start signal of a preset pulse width was generated. The reset pulse width output from the reset pulse generator 300 is not affected by the pulse width of the scanning start signal. The reset pulse has the same pulse width as the pulse width that was used when the LUT information was created. The LUT information is created by a physical mechanism that synchronizes with the scanning start signal. Therefore, though the falling edge of the scanning start signal occurs abnormally late, the counter 310 counts the reset pulses, and the counted value is input into the LUT 320. This counted value serves as an address.

Though the output of the counter 310 is input into the LUT 320 as an address signal, the LUT 320 does not operate until the falling edge of the scanning start signal. The LUT 320 is enabled only at the falling edge of the scanning start signal. The LUT outputs the LUT information in the form of digital data. As described above, the output digital data is the data stored in the LUT 320 that was created by measuring the linearity of the scanner in advance.

The converter 330 generates a clock signal having a frequency corresponding to the digital data output from the LUT 320. The clock signal output from the converter 330 is used as signal for correcting the non-linearity of the scanner. The clock signal is input into a laser scanning unit. Since the laser scanning unit scans a photosensitive belt based on the input clock signal, the non-linearity is simultaneously corrected during scanning. At this time, though the pulse width of the scanning start signal is varied, the counter 310 is operated by a pulse having a pulse width having no relation to the pulse width of the scanning start signal. The pulse signal serves as a reference signal of the device for correcting the non-linearity. The LUT 320 is then enabled at the falling edge of the scanning start signal. Accordingly, the correction of the non-linearity can be precisely accomplished.

Figure 4:
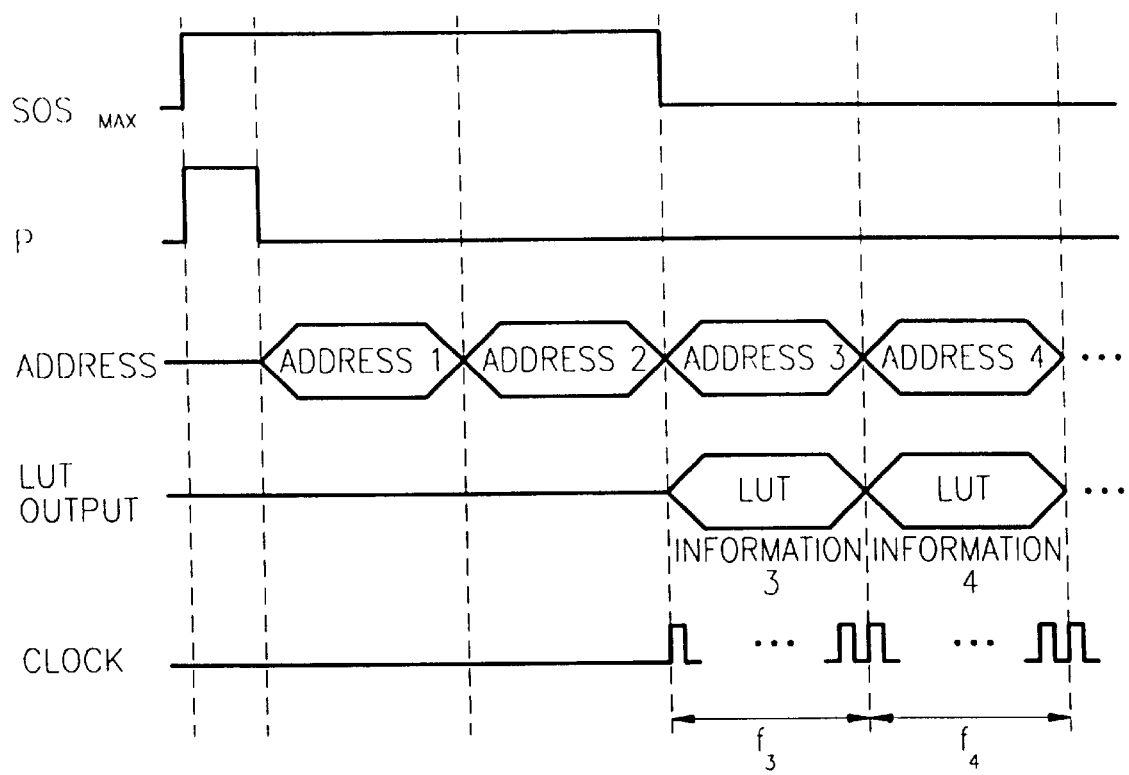
FIG. 4 is a timing diagram illustrating output signals when a scanning start signal is generated for an extended duration in the device of FIG. 3.

FIG. 4 shows signal waveforms that correspond to the operation of the device for correcting the non-linearity of a scanner according to the present invention. Referring to FIG. 4, the counter 310 is reset and operates at the falling edge of the reset pulse (P) generated in the reset pulse generator 300. The operation of the counter is not affected by the pulse width of the scanning start signal ($SOS_{max}$) that varies because of external factors such as vibrations of the photosensitive belt. Therefore, though the falling edge of the scanning start signal ($SOS_{max}$) does not yet occur, the counter 310 outputs the counted value, i.e., the address signal.

Meanwhile, the LUT 320 is enabled at the falling edge of the scanning start signal. Therefore, since the counter 310 outputs address 3 only at the falling edge of the scanning start signal, the LUT 320 outputs LUT information corresponding to address 3, in the form of digital data. Then, the converter 330 converts the digital data into a clock pulse with frequency $f_3$ and outputs the clock pulse. Further, when the counter 310 outputs address 4 after outputting address 3, the LUT 320 outputs LUT information corresponding to address 4, in the form of digital data. Consequently, the clock pulse with frequency $f_4$ is input into the laser scanning unit, and the non-linearity of the scanner is corrected.

Although a particular embodiment of the invention have been described with reference to the accompanying drawings for the purposes of illustration, it should be understood that various modifications and equivalents may be made by those skilled in the art without departing from the spirit and scope of the invention. Accordingly, it must be understood that the invention is limited only by the attached claims.

As described above, with the device for correcting the non-linearity of the scanner of an image forming apparatus according to the present invention, since a constant clock pulse can be output even when the pulse width of a scanning start signal is varied, the non-linearity can be precisely corrected.

What is claimed is:

1. A device for correcting non-linearity of a scanner comprising:
    an input that receives a scanning start signal;
    a reset pulse generator for generating a reset pulse with a predetermined pulse width when the reset pulse generator receives the scanning start signal from the input;
    an address generator for outputting an address by being reset by the reset pulse;
    a LUT (look-up table) initiated by the scanning start signal, for receiving an address from the address generator and for outputting digital data corresponding to the address by using stored information; and
    a converter for outputting a synchronizing signal with a frequency corresponding to the digital data.

2. A device as claimed in claim 1, wherein the reset pulse generator generates the reset pulse in synchronization with the rising edge of the scanning start signal.

3. A device as claimed in claim 1, wherein the LUT is initiated in synchronization with the falling edge of the scanning start signal.

4. A device as claimed in claim 1, wherein the address generator is a counter.

5. A method for correcting non-linearity of a scanner, said method comprising:
    (a) generating a sensing signal by detecting a predetermined area;
    (b) generating a scanning start signal corresponding to the sensing signal;
    (c) generating a reset pulse with a predetermined pulse width in synchronization with the scanning start signal;
    (d) generating and outputting addresses on receiving the reset pulse;
    (e) generating digital data from a LUT, the digital data corresponding to said addresses of step d; and
    (f) outputting synchronizing signals with a frequency corresponding to the digital data.

6. A device for correcting non-linearity of a scanner comprising:
    an input that receives a scanning start signal;

a reset pulse generator for generating a reset pulse with a predetermined pulse width, the reset pulse generator being driven by the scanning start signal;

an address generator for outputting an address by being reset by the reset pulse;

a LUT (look-up table) initiated by the scanning start signal, for receiving an address from the address generator and for outputting digital data corresponding to the address by using stored information, the stored information being created by measuring scanner linearity using a scanning start signal having a preset pulse width; and a converter for outputting a synchronizing signal with a frequency corresponding to the digital data.

7. A device as claimed in claim 6, wherein the predetermined pulse width is the same pulse width as the pulse width of the scanning start signal used when the information stored in the LUT was created.

* * * * *